Patented May 12, 1953

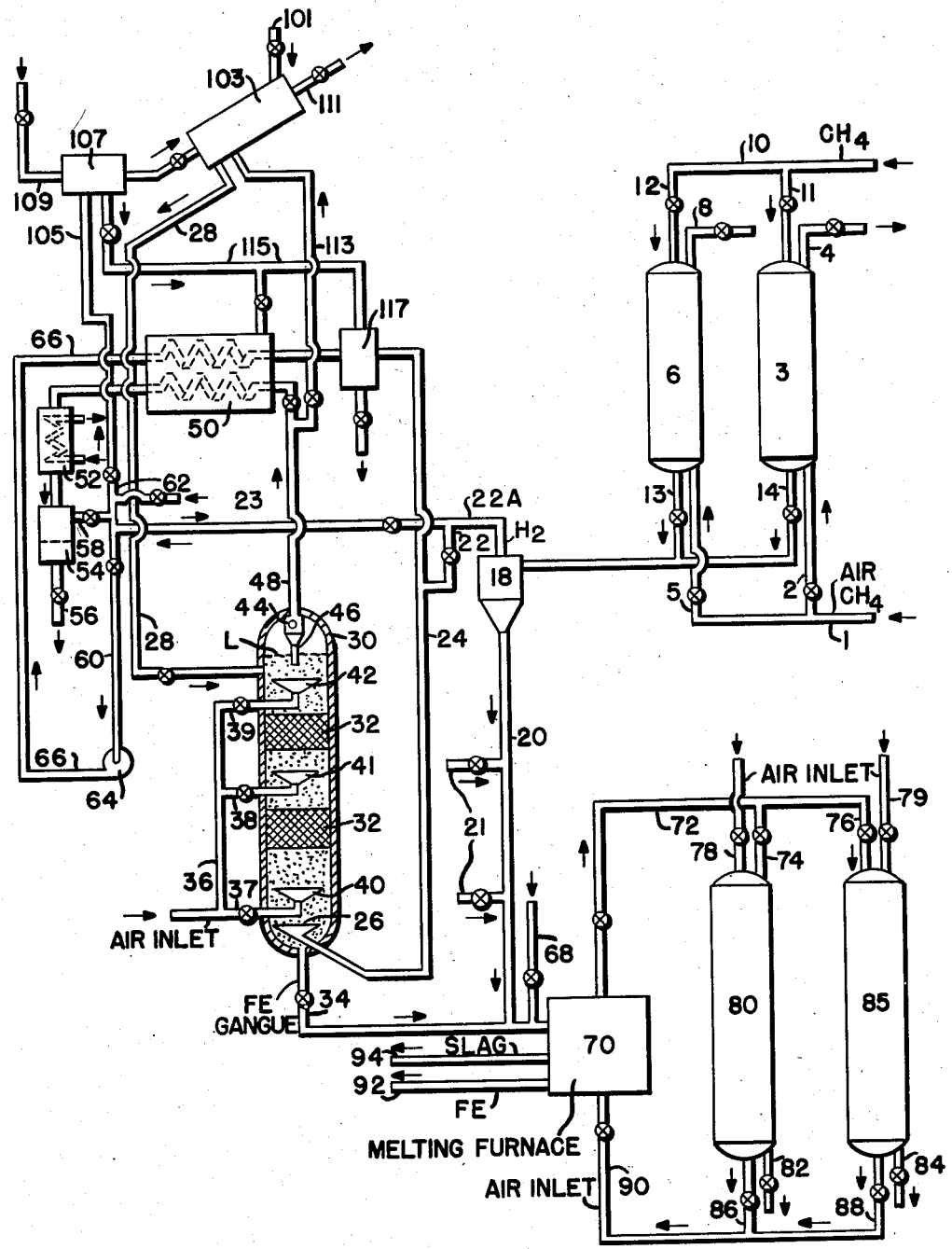

2,638,414

UNITED STATES PATENT OFFICE 2,638,414

PROCESS OF RECOVERING METALS BY GASEOUS REDUCTION

Warren K. Lewis, Newton, Mass., assignor to Standard Oil Development Company, a corporation of Delaware Application July 30, 1948, Serial No. 41,604

13 Claims. (Cl. 75—26)

The present invention is directed to the production of metals and, particularly, to the recovery of metals from their oxides and oxidic ores, such as iron from iron ore, nickel from nickel ore, etc.

In the past, efforts have been made to utilize natural gas for the recovery of iron from iron ore. The direct utilization of natural gas, as a reducing agent, is extremely complicated chiefly as a result of the strongly endothermic character of the reducing reactions and the difficulties encountered in supplying the heat required without affecting the efficiency of the reducing reaction. The procedure adopted in most cases is, therefore, to convert natural gas by oxidation, reformation or thermal decomposition into more efficient reducing gases such as $H_2$ and/or CO and to use these converted gases as the reducing agent.

For example, it has been suggested to convert natural gas thermally into a gas rich in free hydrogen and thermatomic carbon and suspending powdered iron or in a stream of this gas in such a way that the mixture presents the appearance of a boiling liquid and the powdered iron ore and resulting powdered iron are carried along slowly by the gas stream. Sufficient air is admitted with the hydrogen to produce, by combustion of the latter, sufficient heat to maintain the desired reduction temperature. The thermatomic carbon may be utilized in melting the powdered iron produced.

While this and similar fluid solids procedures afford important advantages with respect to heat economy, ease of materials handling and process control, difficulties may be encountered in controlling vertical back-mixing of fluidized solids and in maintaining the atmosphere within the entire reduction zone on the reducing side so as to permit the recovery of a fully reduced metallic product in a once-through or single stage process, particularly in continuous operation. Vertical back-mixing results in the withdrawal of a solids mixture of average rather than of highest degree of reduction. A non-reducing or even oxidizing atmosphere may form when the ratio of the partial pressures of hydrogen and water formed by the reduction and/or combustion reaction within the reduction zone drops below the minimum at which reduction of iron oxides may take place at the temperature involved.

The present invention overcomes the aforementioned difficulties and affords various additional advantages. These advantages, the nature of the invention and the manner in which it is carried out will be fully understood from the following description thereof read with reference to the accompanying drawing.

It is, therefore, the principal object of the present invention to provide improved means for recovering metals from their reducible compounds.

Another object of the invention is to provide an improved process for reducing oxidic metal ores with gases rich in free hydrogen.

A more specific object of the invention is to provide an improved process for recovering metals from finely divided oxidic metal ores by reduction with a gas rich in free hydrogen, while maintaining the ore in the form of a dense turbulent mass fluidized by an upwardly flowing gas to resemble a boiling liquid forming a well defined upper level.

Other and more specific objects and advantages will appear hereinafter.

In accordance with the present invention, a stoichiometrical excess of a gas rich in hydrogen is contacted at a reducing temperature below the sintering point of the metal involved with a dense turbulent mass of a finely divided reducible solid metal compound fluidized by an upwardly flowing gas to resemble a boiling liquid having a relatively well defined upper level and the ratio of hydrogen partial pressure to water partial pressure is maintained at or above the minimum required to establish reducing conditions. This is accomplished by recycling unconverted hydrogen to the reduction zone after the removal of water from the recycle hydrogen. The heat required to maintain the desired temperature in the reduction zone is supplied as preheat of process solids and gases and/or by a controlled combustion of hydrogen with air and/or oxygen within the reduction zone. Preferably, the recycle rate of $H_2$ free of water is so controlled that the partial pressure ratio of $H_2:H_2O$ leaving the reduction zone proper falls within the approximate range of from 3 to 2 for reduction temperatures varying from about 700° C. to about 900° C. In this manner, the invention prevents the buildup of water and thus the formation of a non-reducing or oxidizing atmosphere in the fluidized reaction zone. The hydrogen required for the process may be produced in any conventional manner. It is preferably obtained by a suitable conversion of natural gas or similar hydrocarbon gases including refinery gases.

The amounts of $H_2$ and oxygen required to establish these conditions depend primarily on the type and particle size of the metal compound involved, the heat insulation of the reduction zone and the preheat of the solids, hydrogen and air. Oxidic iron ores, for example, may be employed in particle sizes varying from about 20 to 100 microns to be converted by the gases flowing upwardly through the reaction zone at linear velocities of about 0.3–5 ft. per second into dense, turbulent, fluidized masses having apparent densities of about 30–150 lbs. per cu. ft. Masses of this type may be successfully reduced in a reducing zone by preheating the ore even up to temperatures of about 1200° C. and the hydrogen and/or air to about the same temperature and supplying not greatly in excess of the stoichiometric amounts of hydrogen to the process. By adequate preheat as described above, together with proper equipment designed to minimize heat losses, the air requirement for the reduction zone may be kept at very low levels or even eliminated entirely.

In order to eliminate or substantially reduce back-mixing of solids and its adverse effects on the recovery of pure metal, the present invention provides for a true counter-current flow of reducible metal compound and reducing gas. For this purpose, the finely divided reducible solid, in a dense fluidized state, is passed downwardly through a vertically extending reduction zone in countercurrent to the upflowing reducing gas and the vertical motion of fluidized solids is obstructed at one or more levels of the reactor height preferably by packings of coarse refractory bodies of non-fluidizable particle size.

When so operating, it may also be desirable to feed at least a substantial portion of any air and/or oxygen required for heat generation to an intermediate and/or upper portion of the reaction zone. In this manner, a substantial portion or all of the heat to be generated within the reaction chamber may be produced in the upper portions of the chamber while the solid is still in the oxide form so that an oxidizing atmosphere which may result from a high water concentration may be maintained to no disadvantage. The heat so generated is transferred as sensible heat of the solids to lower zones wherein the reduction may be carried out in a reducing atmosphere with no or only a limited production of heat and water by additional controlled combustion. However, in doing this, it is imperative to avoid bringing the solids to temperatures substantially above 900° C. after metallic iron has begun to form, since otherwise sintering and fluidization troubles will be encountered.

The gas, rich in hydrogen used as the reducing agent, may be produced from hydrocarbon gases such as natural gas, refinery gas, methane, or the like by such conventional methods as controlled oxidation, thermal or catalytic reformation with steam and/or $CO_2$, or the like. In practice, it is preferred, however, to subject the hydrocarbon gas to pyrolysis to convert it into carbon and hydrogen. In this case, the hydrogen produced is at a temperature above 1000° C. whereby the use of air in the reduction zone itself may be substantially reduced or even completely eliminated. In addition, the carbon produced is thermatomic carbon which lends itself readily to introduction into a flowing stream of the powdered product metal for carbonization of the latter and to facilitate its melting.

The nature of the present invention will be more readily apparent from the following description of the accompanying drawing in which the single figure is a semi-diagrammatic illustration of an apparatus suitable for the practice of the present invention.

Referring now in detail to the drawing, the system illustrated therein essentially comprises regenerative hydrogen generation equipment 3, 6, a reduction chamber 30, water separator 54, and metal melting equipment 70, 80 and 85, whose functions and cooperation will be explained forthwith using the reduction of an iron ore such as magnetite, hematite or the like with hydrogen produced from natural gas as an example. It should be understood, however, that the apparatus shown may be applied in a substantially analogous manner to the reduction of oxidic ores of other metals.

In operation, hydrogen is produced from natural gas in the regenerative gas pyrolysis chambers 3 and 6 which are operated alternately in a conventional manner. To start up the procedure, a mixture of natural gas and air in a suitable proportion for high temperature combustion may be introduced through lines 1 and 2 into chamber 3 which is, preferably, packed with a refractory material of high heat capacity such as brick or the like. The combustion mixture is burned within chamber 3 and flue gases are withdrawn overhead through line 4. When the packing of chamber 3 has reached a temperature suitable for the pyrolysis of methane, say about 1100° to 1300° C., line 2 is closed and the combustion mixture is passed from line 1 through line 5 into chamber 6 from which flue gases are withdrawn through line 8. Simultaneously, substantially dry natural gas is fed from manifold 10 through line 11 to chamber 3 wherein pyrolysis of methane into $H_2$ and thermatomic carbon takes place. A suspension of carbon in $H_2$ and small amounts of unconverted methane is withdrawn from chamber 3 through line 14 and passed substantially at the temperature of the pyrolysis to the ore reduction system. When the temperature of chamber 3 has fallen substantially below 1100° C., line 5 is closed and line 2 reopened and the natural gas feed is diverted from line 11 and chamber 3 to line 12 and chamber 6 which meanwhile has been brought to pyrolysis temperature. Carbon and $H_2$ from chamber 6 pass through line 13 and line 14 to the ore reduction system. In this manner, a substantially continuous flow of high temperature hydrogen and carbon to the system may be sustained.

The suspension of carbon in hydrogen flows to a conventional gas-solids separator, such as cyclone separator 18. Carbon is withdrawn downwardly from separator 18 through an aerated standpipe 20, or the like, to be used as will be explained hereinafter. Process hydrogen or any other non-oxidizing gas may be supplied through taps 21 for aeration purposes.

Hydrogen is withdrawn overhead from separator 18 and may be passed without substantial heat loss through lines 22 and 24 to the bottom portion of chamber 30 which it enters through a perforated distributing device 26 at a temperature of about 1000° to 1200° C.

Finely divided iron ore which may have a fluidizable particle size distribution of about 50 microns to 10 mesh may be supplied by any conventional means, such as an aerated standpipe, a screw conveyor, a lock hopper, etc. through line 28 to the upper portion of chamber 30. The fresh iron ore may be preheated to a temperature preferably even as high as 1200° C. by any conventional means.

For example, the powdered ore may be fed through line 101 to a preheater 103 which may have the form of a rotary kiln. Excess hydrogen entering line 23 as will appear more clearly hereinafter may be passed through line 105 to a burner 107 to which preheated air may be fed through line 109, sufficient in amount to burn the hydrogen in burner 107. Hot combustion gases from burner 107 may then be passed to kiln 103 and preheat the ore in countercurrent flow. Cold flue gases may be withdrawn through line 111. Preheated ore passes from preheater 103 through line 28 to reactor 30. It is noted, however, that this preheating method is suitable only for ores having a high state of oxidation. When ores of the FeO oxidation stage, such as siderite are used undesirable oxidation would take place during the preheating treatment with hot combustion gases. In this case it is preferred, therefore, to use the sensible heat of spent reducing gas which may be branched off line 48 through line 113 and supplied as such to preheating kiln 103.

The iron ore entering reduction chamber 30 is converted by the upwardly flowing hydrogen and gaseous reduction products into a dense, turbulent, fluidized mass resembling a boiling liquid having an upper level L. For this purpose, the dimensions of reduction chamber 30 are so chosen that substantial reduction of iron ore to metallic iron may take place during the downward passage of the metal through reduction chamber 30 at a temperature of about 700° to 900° C. and at linear gas velocities within chamber 30 of, preferably, about 0.1 to 1.5 ft. per second to establish apparent phase densities within chamber 30 of about 70 to 125 lbs. per cu. ft. The amount of hydrogen fed to the bottom of chamber 30 is so controlled as to maintain the ratio of $H_2$ to water vapor leaving the final reduction zone of chamber 30 within the range specified above.

In accordance with the preferred embodiment of the invention, one or more packings 32 of coarse refractory bodies of non-fluidizable particle size are arranged at intervals over the length of chamber 30. These packings may be composed of Raschig rings, Berl saddles, or the like having diameters of about 1–3 in. and consisting of clay, chamotte, ceramics, or similar material. These packings permit an upward flow of the gas and downward passage of finely divided ore and simultaneously limit the vertical back-mixing of fluidized solids across the height of the packings. The overall downward motion of the fluidized solids is accomplished by the continuous feed of solids to the top through line 28 and continuous withdrawal of solids through line 34 from the bottom of chamber 30, as a result of the pseudo-hydrostatic pressure exerted by the fluidized mass. This arrangement assures true countercurrent flow of solids and gases and the withdrawal of metal of the highest rather than of average degree of reduction through line 34. Depending on the linear velocity of the gases, the unit may be so operated that chamber 30 is filled with a substantially continuous fluidized mass having a single top level L or so that several fluidized beds are formed having individual levels between the packings.

If the preheat of the hydrogen and iron ore is insufficient to maintain the desired reduction temperature within chamber 30, air and/or oxygen may be supplied from manifold 36 through any one or all of lines 37, 38 and 39 and perforated distributing devices 40, 41 and 42, respectively, to generate additional heat within chamber 30 by combustion of excess hydrogen. It is preferred, however, to supply most or all of the air and/or oxygen to the upper portions of chamber 30 through lines 38 and/or 39. In this manner, most of the heat generated within chamber 30 may be produced in contact with the fresh ore in a zone in which no or only limited reduction is required and in which even oxidizing conditions may be permitted. The heat so generated is taken up by the ore and transferred to lower sections of chamber 30 wherein reduction may take place under the action of substantially pure hydrogen. As a result, less heat needs to be generated in contact with the ore undergoing reduction and the maintenance of a reducing atmosphere in the reduction zone proper is simplified. The amount of air required for this depends on the amount of preheat of the reagents and the heat losses of the system.

The air supplied through manifold 36 is preheated to temperatures preferably up to even 1200° C. If desired the preliminary stages of this preheat may be secured in heat exchange with the flue gases from pyrolysis units 3 and 6. The total amount of air fed to chamber 30 is so controlled that just enough oxygen is made available in chamber 30 to maintain therein a reduction temperature of about 700°–900° C.

A mixture of unconverted hydrogen with steam and traces of CO and $CO_2$ is withdrawn overhead from level L and passed through a conventional gas-solids separator such as cyclone 44 from which separated ore fines are returned through pipe 46 to chamber 30. The gas mixture, now substantially free of ore fines, leaves separator 44 at a temperature of about 700°–1100° C. depending on the amount and location of the heat generation within chamber 30. The steam content of the gas is determined by the ratio of $H_2:H_2O$ employed and by the air consumption, discussed above.

The hot gases flow through line 48, heat exchanger 50 and condenser 52 to a water separator 54 in which water is removed by condensation, if desired, in combination with conventional chemical and/or physical drying means. Condensate water may be withdrawn through line 56 and substantially dry $H_2$ flows through pipe 58 to line 60 from which other impurities may be purged through vent 62. The purified hydrogen is taken up by blower 64, passed through line 66 and heat exchanger 50 and returned to hydrogen feed line 24 or, if desired, to a separate recycle line leading to the bottom portion of chamber 30. In heat exchanger 50 the recycle hydrogen is heated up to reduction temperature in heat exchange with the hot off-gas from chamber 30. If desired, additional preheat may be added by feeding hot combustion gas from burner 107 through line 115 to a preheater 117 through which line 66 passes. Suitable hydrogen recycle ratios may range from about 2 to about 3 volumes of recycled gas per volume of fresh hydrogen supplied. When operating in this manner, the water concentration in the reducing zone of chamber 30 may be readily kept below the limit at which oxidation of metallic iron may take place at the temperatures involved.

Reduced finely divided metal admixed with gangue is withdrawn under the pseudo-hydrostatic pressure of the dense fluidized mass of ore in chamber 30, through bottom drawoff line 34 and passed substantially at reduction temperature to a melting furnace 70 if desired after the addition of thermatomic carbon supplied through standpipe 20 from separator 18. Slag-forming materials may be introduced through line 68, if desired, or if the iron contains ingredients which require their use. The carbon added through line 20 serves as the only fuel used in melting furnace 70 so that sufficient heat may be generated by combustion of the carbon to CO rather than to $CO_2$. In this manner, the maintenance of a strongly reducing atmosphere in furnace 70 is assured and the off-gases from furnace 70 have a relatively high B. t. u. content which may be utilized to preheat the air required for the heat-generating combustion in furnace 70.

For the latter purpose, the CO-containing off-gas from furnace 70 is passed through lines 72 and 74 or 76 alternately to conventional regenerative air heaters 80 and 85, respectively, wherein the gas is burned with air supplied through lines 78 and 79, respectively, to heat up chambers 80 and 85 to air-preheat temperature. Thereafter, air alone is passed alternatingly through chambers 80 and 85, withdrawn therefrom through lines 86 and 88, respectively, and passed through line 90 at the desired temperature to furnace 70. Flue gases from the burning period may be withdrawn through lines 82 and 84, respectively.

Molten iron and slag may be recovered from the system through lines 92 and 94, respectively. As the result of the use of thermatomic carbon in furnace 70, the molten iron may be saturated with carbon, thus substantially reducing its melting point which may be as low as 1100° C. In this manner, the melting furnace may be operated at low temperature levels of, say, about 1100°–1300° C. The iron thus produced represents a pig iron suitable for conventional methods of purification.

The embodiment of the invention described with reference to the drawing permits of various modifications. The system may be operated in the pyrolysis and/or reduction stage at atmospheric or elevated pressures. More than one reduction chamber 30 may be used. Any desired portion or all of the hydrogen withdrawn from 18 may be passed via line 22a and line 23 to join the recycle hydrogen in line 60 if desirable for heat-economy or other considerations. A screw conveyer or other conventional conveying means may take the place of standpipe 20. Other modifications will occur to those skilled in the art without deviating from the spirit of the invention.

The thermal efficiency of the usual processes of reduction of iron ores to the metal by the use of the conventional reducing gases, such as CO-containing gases like water gas, or coal distillation gases, is notoriously low. In contradistinction the energy requirements for the production of pig iron when using hydrogen in accordance with the present invention can be kept down to levels as low as ½ and in most favorable cases, to as low as ⅓ of the energy requirements for the use of coke in the conventional blast furnace.

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed is:

1. A method of recovering metal from a solid, finely divided compound thereof which is reducible to metal by hydrogen which comprises maintaining a dense, turbulent mass of said metal compound fluidized by an upwardly flowing gas stream to resemble a boiling liquid having a well defined level within a reduction zone at a reduction temperature, causing said fluidized mass of metal compound to flow downwardly against the upwardly flowing stream of gas, limiting the back-mixing of solids in a vertical direction by obstructing the free, vertical flow of solids and gases at least at one point along their vertical path within the reduction zone, contacting said mass with an amount of hydrogen in excess of that required for reducing said compound to metal, supplying heated finely divided metal compound particles to said reduction zone, withdrawing a gas mixture containing hydrogen and steam from an upper portion of said reduction zone, removing water from said gas mixture to obtain substantially dry hydrogen, recycling at least a portion of said dry hydrogen to said reduction zone thereby maintaining the atmosphere in said reduction zone capable of reducing the finely divided metal compound to metal, adding further quantities of hydrogen to said reducing zone and withdrawing reduced metal from a lower portion of said reduction zone.

2. The method as defined in claim 1 wherein said metal compound is an oxidic iron ore.

3. The method as defined in claim 1 wherein a limited amount of air or oxygen is supplied to the reduction zone to burn some of the hydrogen therein to generate at least a portion of the necessary heat of reaction.

4. The method as defined in claim 1 wherein a portion of the hydrogen is burned outside of said reduction zone to generate heat for preheating the finely divided metal compound charge and for preheating the dried hydrogen recycle gas.

5. The method as defined in claim 1 wherein a limited amount of air or oxygen is supplied to the reduction zone to burn some of the hydrogen therein to generate at least a portion of the necessary heat of reaction and a portion of the hydrogen-containing gas is burned outside of said reaction zone to generate heat for preheating the finely divided metal compound charge and for preheating the dried hydrogen recycle gas.

6. The process of reducing a finely divided oxidic metal ore which is reducible to metal by hydrogen which comprises maintaining a dense turbulent mass of said ore fluidized in a vertical reduction zone by an upwardly flowing stream of gas to resemble a boiling liquid having a well defined level, maintaining said mass at a reduction temperature, feeding finely divided ore to an upper portion of said mass, limiting the back-mixing of solids in a vertical direction by obstructing the free, vertical flow of solids and gases at least at one point along their vertical path, passing upwardly through said mass an amount of hydrogen in excess of the amount required for reducing said ore to metal, withdrawing a gas mixture containing hydrogen and steam from an upper part of said reduction zone thereby establishing countercurrent flow of solids and gases within said reduction zone, removing water from said gas mixture to obtain substantially dry hydrogen, recycling said substantially dry hydrogen to the reaction zone, supplying fresh hydrogen to said reaction zone in sufficient amount to provide said excess of hydrogen in the reaction zone and correlating the supply of fresh hydrogen and the recycling of dry hydrogen to control the ratio of the partial pressure of hydrogen to the partial pressure of steam in the gas mixture withdrawn from the reduction zone thereby maintaining the atmosphere in said reduction zone capable of reducing the finely divided metal ore to metal and of preventing reoxidation of reduced metal within the reduction zone and withdrawing reduced metal from the bottom of said reduction zone.

7. The process as defined in claim 6 in which back-mixing of solids in a vertical direction is limited by means of a packing of bodies greater than fluidizable particle size whereby the average degree of reduction of the product withdrawn from bottom of the reduction zone is substantially greater than that of the product in the upper portion of the reduction zone.

8. The process as defined in claim 7 in which said ore is an iron ore.

9. The process as defined in claim 6 in which said ore is an iron ore.

10. The process of recovering a metal from a finely divided oxidic metal ore which is reducible to metal by hydrogen which comprises thermally decomposing a hydrocarbon gas at a decomposition temperature to form hydrogen and thermatomic carbon, separating said hydrogen from said carbon, maintaining a dense, turbulent mass of said ore fluidized in a vertical reduction zone by an upwardly flowing stream of hydrogen-containing gas to resemble a boiling liquid having a well defined level, maintaining said mass at reduction temperature, feeding finely divided ore to an upper portion of said mass, limiting back-mixing of solids in a vertical direction by obstructing the free, vertical flow of solids and gases at least at one point along their vertical path, withdrawing a gas mixture containing hydrogen and steam from an upper part of said reduction zone thereby establishing countercurrent flow of solids and gases within said reduction zone, removing water from said gas mixture to obtain substantially dry hydrogen, recycling said dry hydrogen to the reduction zone, supplying the hydrogen produced by thermal decomposition of the hydrocarbon gas at a temperature not substantially below said decomposition temperature into the lower portion of said reduction zone to thereby supply a substantial portion of the heat required in the reduction of said metal ore, correlating the supply of fresh hydrogen and the recycling of dry hydrogen to provide an amount of hydrogen in the reduction zone in excess of that required for reducing said ore to metal and to control the ratio of the partial pressure of hydrogen to the partial pressure of steam in the gas mixture withdrawn from the reduction zone and thereby maintain the atmosphere in said reduction zone capable of reducing the finely divided metal ore to metal and of preventing reoxidation of reduced metal within the reduction zone, withdrawing reduced metal from the bottom of said reduction zone, combining thermatomic carbon obtained by thermal decomposition of said hydrocarbon gas with said reduced metal and subjecting the resulting mixture to melting conditions in a melting zone.

11. The process as defined in claim 10 in which the ratio of the partial pressure of hydrogen to the partial pressure of steam in said withdrawn gas mixture falls within the approximate range of from 3 to 2 and the temperature in said reduction zone is maintained at about 700° to 900° C.

12. The process as defined in claim 11 in which said ore is an iron ore.

13. The process as defined in claim 11 in which said ore is an iron ore.

WARREN K. LEWIS.

References Cited in the file of this patent

UNITED STATES PATENTS

| Number | Name | Date |
| --- | --- | --- |
| 1,310,724 | Westberg | July 22, 1919 |
| 1,984,380 | Odell | Dec. 18, 1934 |
| 2,166,759 | Greenawalt | July 18, 1939 |
| 2,184,300 | Hodson et al. | Dec. 26, 1939 |
| 2,243,110 | Madaras | May 27, 1941 |
| 2,321,310 | Moore | June 8, 1943 |
| 2,343,780 | Lewis | Mar. 7, 1944 |
| 2,398,443 | Munday | Apr. 16, 1946 |
| 2,399,984 | Caldwell | May 7, 1946 |
| 2,438,584 | Stewart | Mar. 30, 1948 |
| 2,444,990 | Hemminger | July 13, 1948 |
| 2,477,454 | Heath | July 26, 1949 |
| 2,481,217 | Hemminger | Sept. 6, 1949 |
| 2,538,201 | Kalbach et al. | Jan. 16, 1951 |
| 2,559,631 | Kalbach et al. | July 10, 1951 |